United States Patent [19]
Rayfield

[11] 3,717,353
[45] Feb. 20, 1973

[54] STATOR RING FOR FACE-TYPE FLUID SEALS

[75] Inventor: John Allen Rayfield, Toronto, Ontario, Canada

[73] Assignee: Champlain Power Products Limited, Dexdale, Ontario, Canada

[22] Filed: July 18, 1969

[21] Appl. No.: 843,041

[52] U.S. Cl. ....................................................277/96
[51] Int. Cl. ..............................................F16j 15/34
[58] Field of Search...................................277/81, 96

[56] References Cited

UNITED STATES PATENTS

| | | | |
|---|---|---|---|
| 2,100,220 | 11/1937 | King | 277/96 X |
| 2,375,085 | 5/1945 | Curtis | 277/96 X |

Primary Examiner—Robert I. Smith
Attorney—Douglas S. Johnson

[57] ABSTRACT

A state ring for face-type fluid seals on the back face of which there is formed a support annulus, which annulus serves to take up initial loading against the back face of the stator ring and to compensate for any unevenness in the face or its support, or unbalanced loading. The annulus also serves to overcome an overturning moment which develops in the stator ring of the face-type fluid seal in operation. The dimensions of the annulus are chosen with respect to its material so that initial force transmitted therethrough, when that initial force is not evenly distributed around the annulus, is above the yield point of the material but so that ultimate force transmission through the annulus after distribution of the same is below the yield point of the material.

4 Claims, 6 Drawing Figures

PATENTED FEB 20 1973

INVENTOR
JOHN A. RAYFIELD
BY Douglas S. Johnson

PATENTED FEB 20 1973 3,717,353

INVENTOR
JOHN A. RAYFIELD
BY Douglas A. Johnson

STATOR RING FOR FACE-TYPE FLUID SEALS

BACKGROUND OF THE INVENTION

1. Field of the Invention

This invention relates to a stator ring for face-type fluid seals; e.g., hydrostatic, hydrodynamic and rubbing seals. More particularly, the invention teaches a stator ring for face-type fluid seals, on the back face of which stator ring there is formed a support annulus.

Face-type fluid seals are shaft seals in which a stator ring and a rotor ring having opposing faces extending radially outwardly from the periphery of the shaft, and a seal is thereby effected between low pressure and high pressure regions of fluid. In a hydrostatic seal, there is a controlled leakage or flow of the fluid being sealed between the opposing stator and rotor faces from the high pressure region to the low pressure region; whereas in hydrodynamic or rubbing face-type seals, there is little or no fluid flow between the opposing stator and rotor faces. This invention is applicable to all face-type fluid seals, especially hydrostatic seals; and it is hydrostatic seals to which the following discussion is directed.

Generally speaking, a hydrostatic seal is fitted about a shaft, and comprises a rotating ring, or rotor, adapted to rotate with the shaft and a stationary ring, or stator, which is non-rotative. A region of high pressure fluid communicates to the outer periphery of the gap between the opposing faces of the stator and the rotor, and a pressure drop is effected in the fluid entrained between the opposed faces of the rotor and stator. Alternatively, the high pressure region of fluid may communicate to the inner periphery of the gap between the opposing stator and rotor faces, with the outer periphery thereof communicating to the low pressure region. This alternative arrangement is less common, and the more common arrangement having high pressure communication to the outer periphery of the gap is discussed in the detailed description of this invention which follows hereafter.

The hydrostatic seal is adapted to accommodate controlled leakage of the fluid being sealed thereby past the seal from the high pressure region to a low pressure region. Various applications of hydrostatic seals may be found, such as those in space craft where very often the fluid being sealed is a liquid metal; and a more common application of hydrostatic seals may be those found in high pressure pumps such as those used for pumping nuclear reactor coolants.

2. Discussion of the Prior Art

It has been found that means must be provided within a face-type fluid seal to accommodate axial movement along the shaft by the rotor and/or the stator. One approach in the design of face-type fluid seals to control the seal performance, and to accommodate axial movement, has been to isolate both the rotor and stator from the pump housing; and a review of one such design for hydrostatic seals is published in ASME Publication 68 - WA/LUB-9 "The Spring Supported Hydrostatic Seal" by I.J. Billington and T.E. Fitzsimmons. The design for mounting the stator and rotor rings in face-type fluid seals is also considered in Canadian Pat. No. 772,520, issued Nov. 28, 1967 in the name of Jack P. Toronchuk for "Fluid Mounted Shaft Seal."

However, it has been found that it is important that the stator of the face-type fluid seal be well supported relative to the housing and adapted so as to resist annular overturning moments which may develop and act on the stator ring. To this end, there has been developed a stator ring having a support annulus formed on the back face thereof through which there may be a force transmitted which tends to oppose any overturning moment which develops on the ring.

SUMMARY OF THE INVENTION

It is therefore an object of this invention to provide a stator ring for face-type fluid seals having a support annulus formed on the back face thereof, which stator ring may be easily and readily manufactured.

It is another object of this invention to provide a stator ring for face-type fluid seals, which stator ring is adapted to provide for a uniform circumferential force distribution of the axial force acting against a support annulus formed on the back face thereof.

A still further object of this invention is to provide a stator ring for face-type fluid seals having a support annulus formed on the back face thereof and adapted to assure proper alignment of the stator ring as the seal is brought to operating conditions.

BRIEF DESCRIPTION OF THE DRAWINGS

These and other objects and features of the invention will become more obvious in the following detailed description taken in association with the drawings, in which.

The drawings are intended to clearly illustrate the invention and its environment and are not to be taken as representative of any particular hydrostatic seal installation.

DESCRIPTION OF THE PREFERRED EMBODIMENT

Figure 1:
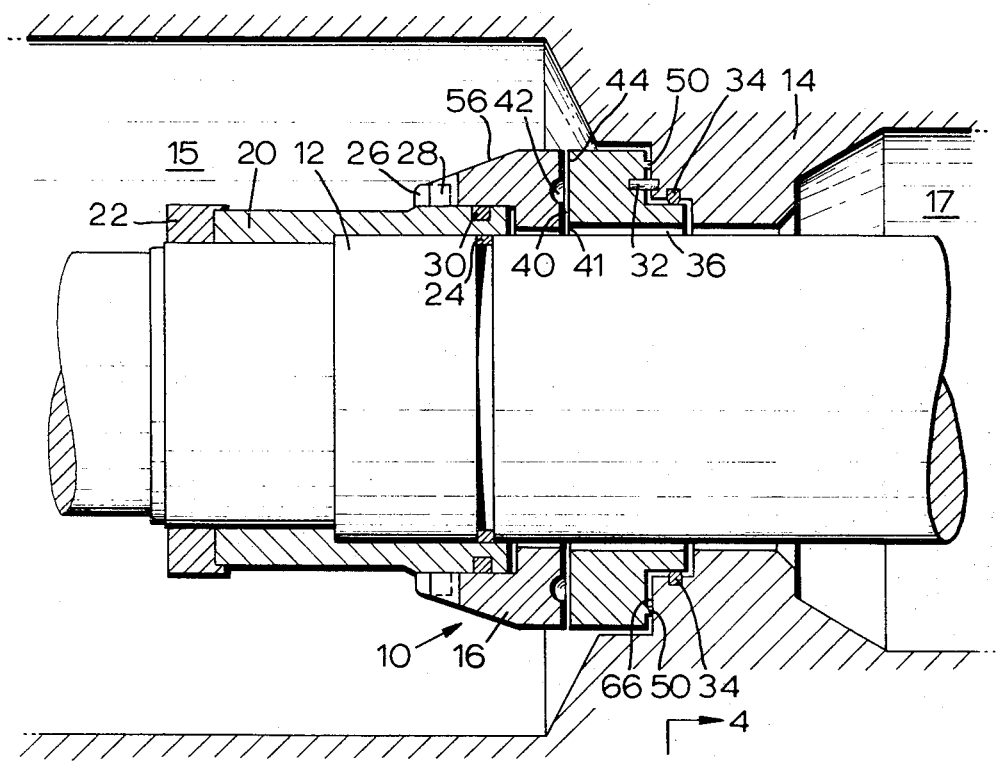
FIG. 1 is a cross-sectional view of a typical hydrostatic seal incorporating the stator ring of this invention.

Referring to FIG. 1, there is shown a typical hydrostatic face-type fluid seal 10 mounted on shaft 12 which extends through a housing 14. The seal 10 is adapted to seal a high pressure region shown generally at 15 within the housing 14, and to permit controlled communication of the fluid within high pressure region 15 past the seal to low pressure region 17. The fluid is entrained between the opposing faces of the rotor 16 and stator 18 in gap 40, and between the shaft 12 and stator 18 in the clearance gap 36 whence it communicates to the low pressure region 17.

A sleeve 20 is keyed to the shaft 12 and is retained at one end thereof in the high pressure region 15 by nut 22. The other end of the shaft sleeve 20 is sealed against the shaft 12 by an O-ring 24 set into the shaft. The shaft sleeve 20 may conveniently be provided with one or more slots 26 which engage with lugs 28 formed on the rotor 16 so that engagement between the lugs 28 and slots 26 causes the rotor 16 to rotate with the shaft sleeve 20 and the shaft 12.

The stator 18 is held against rotation with shaft 12 by means of a pin 32 which extends into a recess 33 in the back face of the stator ring 18 from housing 14. The stator ring 18 may be held stationary with respect to the housing 14 by other means, e.g. keying.

It has been noted that an O-ring 24 is provided to seal the shaft sleeve 20 to the shaft 12. There is also provided an O-ring 30 which precludes leakage of the fluid adjacent the shaft 12 or the shaft sleeve 20 (depending on the exact location of the O-ring 30) from the high pressure region 15. It should be noted that there is a clearance between the periphery of the shaft 12 and the inner, cylindrical face of the rotor 16 facing shaft 12, which clearance may have substantially the same dimensions as the clearance passageway 36 between stator 18 and shaft 12, although the clearance between the rotor 16 and the shaft 12 may be smaller than between the stator 18 and the shaft 12 as is discussed in greater detail hereafter.

An O-ring 34 is provided between the stator ring 18 and the housing 14, and leakage of the fluid from the high pressure region 15 beyond the O-ring 34 is precluded. There may also be provided in the face of the rotor 16 a plurality of grooves 42 which control the pressure of the fluid entrained in the gap 40 between the opposing faces of the rotor 16 and stator 18. The precise configuration of the grooves 42 and the manner in which they communicate to the high pressure region 15 is not relevant to the present invention.

Figure 4:
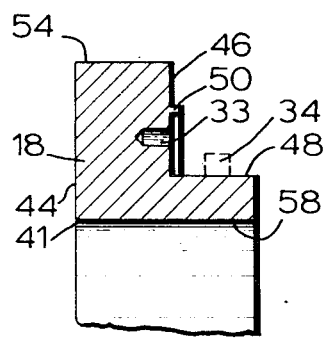
FIG. 4 is a partial cross-sectional view of the stator ring taken along the direction of arrows 4—4 in FIG. 2.
Figure 2:
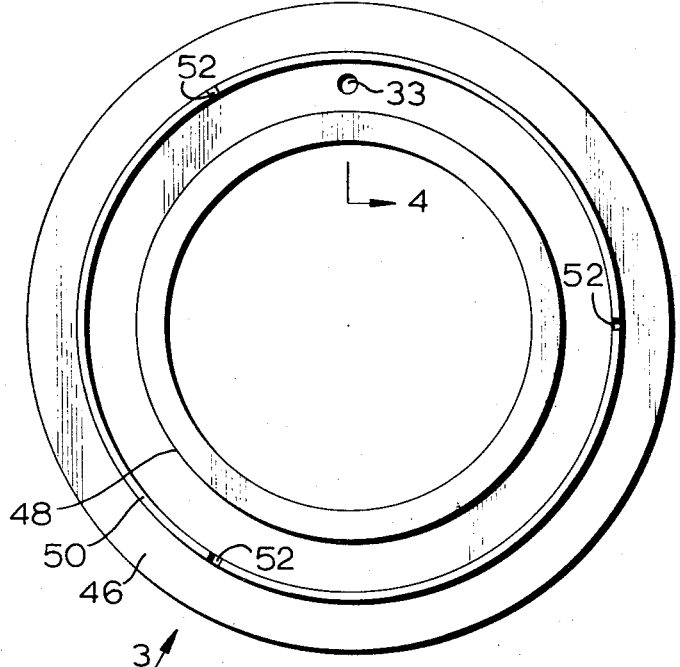
FIG. 2 is a view of the back face of the stator ring.
Figure 3:
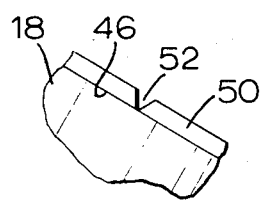
FIG. 3 is a partial side view taken in the direction of arrow 3 in FIG. 2.

Turning to FIGS. 2, 3 and 4, it will be noted that the stator ring 18 as illustrated has a generally L-shaped cross section and comprises a front face 44 and a back face 46. The front face 44 opposes the front face of rotor 16 across the gap 40 therebetween. In the embodiment chosen, the O-ring 34 faces a side wall 48 on the leg of the L as shown in FIGS. 1 and 4. The stator ring 18 may also have substantially constant thickness with the O-ring 34 facing the back face of the stator.

There is formed on the back face 46 of the stator 18 a support annulus 50 which is discussed in greater detail hereafter. Spaced around the support annulus 50 are a plurality of slots or notches 52, usually three in number, which provide for pressure communication of the fluid on both sides of the support annulus 50 (that is, inside and outside the support annulus with respect to the outer surface of the shaft 12) so as to allow pressure to act against the back face 46 in the manner discussed hereafter. Obviously, a single notch 52 may be cut in the support annulus 50 and still permit pressure communication of the fluid on both sides thereof.

It will be noted, then, then, that in the embodiment illustrated the fluid from the pressure region 15 acts against the outer surface 54 of the stator and the outer surface 56 of the rotor, and also acts against the back surface 46 of the stator and that portion of the side wall 48 which is not sealed by the O-ring 34, with identical pressures.

When the hydrostatic seal is to be brought into operation, the high pressure region 15 is pressurized. Fluid from the high pressure region 15 is entrained in the gap 40 between the opposing faces of rotor 16 and stator 18. Because of the nature of hydrostatic seals, there is a pressure drop across the opposing faces so that the pressure of the fluid at the inner end 41 of the gap 40 and in the clearance gap 36 between the outer surface of shaft 12 and the inside surface 58 of stator 18 is at a lower pressure than that of the fluid in high pressure region 15. The low pressure fluid communicates to the low pressure region 17 and may be collected therefrom and re-pressurized for re-introduction into the high pressure region 15.

It becomes obvious that the stator ring 18 must be such that when the seal 10 is operating, the ring is supported with its front face 44 substantially perpendicular to the outer surface of the rotating shaft 12 within close tolerances. Of course, the opposing face of the rotor 16 must be substantially parallel to the front face 44 of the stator 18; but because of the entrainment of fluid within the gap 40, and other design considerations not relevant to the present invention, the parallel facing relationship of the opposing face of the rotor 16 to face 44 of the stator 18 is fairly readily accomplished.

(In hydrodynamic or rubbing face-type fluid seals, there will also be an entrainment of fluid between the opposing rotor and stator faces, but the quantity of fluid flow between the faces is substantially diminished with respect to the fluid flow in hydrostatic seals. Also, as noted, in any face-type fluid seal, the high pressure region of fluid may communicate to the inner end of the gap between the opposing rotor and stator faces, with the low pressure region communicating to the outer end of the gap. However, the effect of a stator ring incorporating the present invention, when placed in any face-type fluid seal, will be as herein discussed.)

Figure 5:
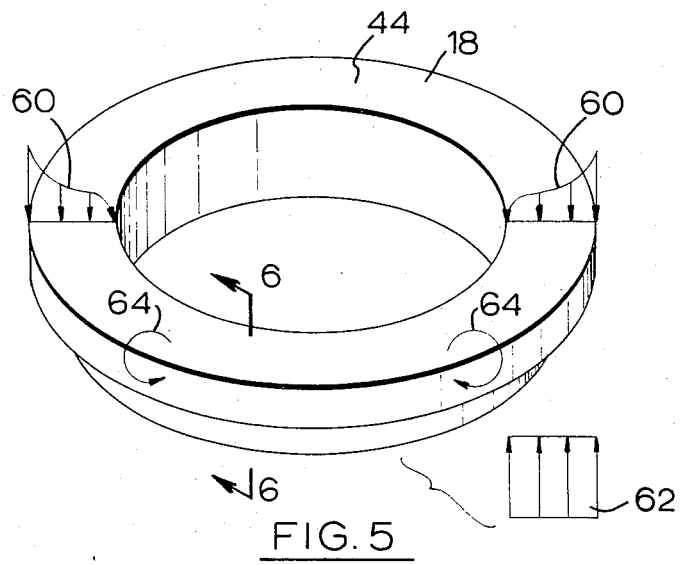
FIG. 5 is a diagrammatic perspective view of a stator ring according to this invention.
Figure 6:
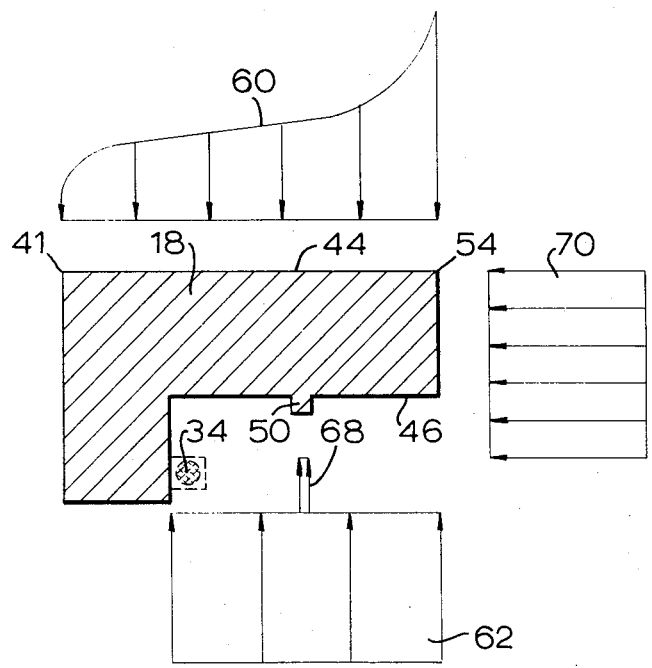
FIG. 6 is a diagrammatic representation of a pressure profile taken through a one-half cross section of the stator ring of FIG. 5 at arrows 6—6.

Turning to FIGS. 5 and 6, it will be noted that the pressure acting against the front face 44 of the stator 18 will have a pressure profile somewhat as shown at 60. In any event, the pressure at the outer edge 54 of the front face 44 is high and reduces to a low pressure at the inner edge 41 of the front face. The reduction of pressure across the front face 44 of stator 18 is not constant in this case due to the influence of the grooves 42 formed in the opposing front face of the rotor 16. It will also be noted, as stated above, that the fluid pressure acting on the back face 46 of the stator 18 is constant as indicated at 62 and has a magnitude equal to the highest pressure acting against the front face 44 because of the fluid communication of the back face 46 (on both sides of support annulus 50 through notches 52) and of the outside edge 54 of the front face 44 to the high pressure region 15. The consequence of the distribution of forces acting on the stator ring 18 is that an overturning moment tends to act on the ring in the manner as indicated by arrows 64. (The overturning moment could, of course, act in a negative direction to that indicated by arrow 64 as a consequence of a different distribution of forces on the stator.) This overturning moment is such that it tends to turn the stator ring 18 inside out. A practical consequence of the overturning moment 64 is that the clearance gap 40 between the opposing faces of the rotor 16 and stator 18 may alter dimensions; and in severe cases the dimension of the clearance gap 40 may reduce to zero at any point radially outward from the shaft 12 so that physical contact occurs between the faces at that point, and the clearance gap is thereby blocked.

(It is to be noted that due consideration is taken in the design of the stator 18 and the rotor 16 to accommodate dimensional changes that may occur as the seal 10 is pressurized. That is, due cognizance is taken of the fact that the material of the rotor 16 and the stator 18 may, in fact, shrink very slightly due to the action of the fluid within the high pressure region 15 acting on the outer and rear peripheries of the rotor and stator. Also, as noted above, the clearance gap 36 between stator 18 and shaft 12 may be identical to the clearance gap between rotor 16 and shaft 12; but this, too, is a specific design consideration provided only that the design accounts for maximum or ultimate working pressures.)

To accommodate the overturning moment 64 which may develop on the stator ring 18, a support annulus 50 is formed on the back face 46 of the stator. It will be noted from FIG. 1 that the support annulus contacts the supporting face 66 of the housing 14. The precise dimensions of the support annulus 50, i.e. its height and its width, are chosen in each case having regard to the material of which the stator 18 is made in a manner discussed hereafter.

It becomes clear, particularly from a consideration of FIG. 6, that it is the purpose of the support annulus 50 to provide an additional force acting upwardly against the back face 46 of the stator 18 apart from those forces acting thereon due to the high pressure fluid, so that the additional force tends to overcome the overturning moment 64. Since the magnitude of the overturning moment can be readily determined for any given operating condition, (and since the pressure profiles on the stator are substantially proportional to the working pressure of the fluid) the position of the support annulus 50 on the back face 46 can be calculated. The force 68 transmitted through the support annulus can also be calculated according to the following equation:

$$F_R = \int F d(A_1) - \int F d(A_2) \quad 1.$$

where -

$F_R$ is the force transmitted through the support annulus;

$A_1$ is the area of the front face 44;

$A_2$ is the area of the back face 46; and $F$ is the local fluid pressure of the fluid being sealed.

Equation 1. is graphically illustrated in FIG. 6 where $F_R$ is shown at 68 and the first expression of the right hand side of equation 1. is shown at 60 and the second expression of the right hand side of equation 1. is shown at 62. It will also be noted that in steady state working conditions, there is a radial force 70 which acts on the outer surface of the stator 18, and the effect of this pressure is allowed for in the design of the stator having regard both to its elasticity and its rigidity. A shear force may develop across the support annulus 50, which shear force is also accountable in the same sense as the radial force 70.

Having determined the magnitude of the force 68 which must be transmitted through the support annulus 50 to oppose the overturning moment 64, the height and width of the support annulus may be easily chosen in accordance with the following principle:

It is recognized that even with very close manufacturing tolerances, the supporting face 66 of housing 14 and the back face 46 of stator 18 and the support annulus 50 cannot be machined to assure always that the support annulus 50 will contact the support face 66 throughout its entire length. Therefore, the height and width of the support annulus 50 are chosen so that the force 68 transmitted through it as calculated by equation 1. above is close to the yield point of the material of the support annulus. Consequently, when the face-type fluid seal 10 is brought to its working state — and in the event that the force 68 transmitted through the support annulus 50 is not initially taken up and evenly distributed throughout its length — there will be a compression or yielding of the material of the support annulus 50 at the initial force-contact points between it and the supporting face 66 which will continue, with a slight but permanent distortion of the support annulus, until a substantially uniform distribution of the force 68 throughout the support annulus is achieved, or at least until the force per unit length being transmitted through the support annulus anywhere throughout its length falls below the yield point of the material thereof. The shear force which may act on the support annulus 50 is also considered in making the above determinations.

It is necessary that the effect of the force profile 60 acting on the front face 44 of the stator 18 be greater than the effect of the force profile 62 acting on the back face 46 (as noted in equation 1. in order to preclude axial migration of the stator 18 towards the rotor 16 during operation of the seal 10.

It has been noted previously that a spring operated hydrostatic seal has been developed to accommodate the back-up pressure due to the differences between the force acting on the front face 44 and the force acting on the back face 46; but the support annulus 50 formed on the back face 46 of the stator 18 accomplishes the same purpose and is such that it may be more readily and economically provided and manufactured with very close tolerances.

The above description has been related to a general representation of a hydrostatic seal, but the principles relate to any face-type fluid seal which can accommodate the inclusion of a support annulus in the high pressure region behind the back face of the stator ring, as discussed.

The embodiments of the invention in which an exclusive property or privilege is claimed are defined as follows:

1. For use in a face-type fluid seal, a stator ring having a generally L-shaped cross-section and having formed on the back face thereof a support annulus upstanding therefrom, the back face being one of the faces on the inner side of the "L," said annulus extending from said back face in an axial direction and having at least one notch formed therein in a radial direction; the width of said annulus being substantially smaller than the width of said back face and the height of said annulus being substantially smaller than the axial thickness of said stator ring.

2. In a face-type fluid seal having a housing, a stator ring have a generally L-shaped cross-section and an opposing rotor ring within said housing and around a rotatable shaft, a high pressure region of fluid within said housing on one side of said seal and a low pressure region of fluid within said housing on the other side of said seal; said stator ring having a front face which opposes a face of said rotor ring, and a back face being one of the faces on the inner side of the "L," the improvement comprising: a support annulus upstanding from said back face of said stator ring in an axial direction and having at least one notch formed therein in a radial direction, the height and width of said support annulus being substantially smaller than the axial thickness and width respectively of said stator ring.

3. The combination of claim 2 wherein the height and width of said support annulus are chosen so that in the event there is uneven contact upon initial contact of said support annulus with a supporting face therefor formed in said housing, the force transmitted axially through said support annulus is above the yield point of the material thereof thereby causing distortion of said support annulus at the initial force-contact points; said distortion of said support annulus being continued along the length thereof so that the force transmitted therethrough is distributed more evenly along said length and the force per unit length is reduced until said force being transmitted axially through said support annulus throughout its length falls below the yield point of the material thereof.

4. The combination of claim 3 wherein the force to be transmitted axially through said support annulus is calculated according to the equation:

$F_R \doteq Fd(A_1) - Fd(A_2)$ where:
$F_R$ is the force transmitted axially through the support annulus;
$A_1$ is the area of the front face of said stator ring;
$A_2$ is the area of the back face of said stator ring; and
$F$ is the local fluid pressure of the fluid being sealed.

* * * * *